US00RE39010E

(19) United States
(12) Reissued Patent
Gish et al.

(10) Patent Number: US RE39,010 E
(45) Date of Reissued Patent: Mar. 14, 2006

(54) LIGHTWEIGHT ACOUSTICAL SYSTEM

(75) Inventors: Laura E. Gish, Carlisle, PA (US); Liangyu Huang, Novi, MI (US); Gordon Ebbitt, Ann Arbor, MI (US); Barry Wyerman, Novi, MI (US); David Boyles, Carlisle, PA (US)

(73) Assignee: Lear Corporation, Southfield, MI (US)

(21) Appl. No.: 10/171,181

(22) Filed: Jun. 13, 2002

Related U.S. Patent Documents

Reissue of:
(64) Patent No.: 6,296,075
Issued: Oct. 2, 2001
Appl. No.: 09/586,504
Filed: Jun. 2, 2000

(51) Int. Cl.
*E04B 1/82* (2006.01)

(52) U.S. Cl. ..... 181/290; 181/286
(58) Field of Classification Search ..... 181/284, 181/286, 290, 291, 294, 295
See application file for complete search history.

(56) References Cited

U.S. PATENT DOCUMENTS 3,948,347 A * 4/1976 Rutledge
4,508,774 A * 4/1985 Grabhoefer et al.
4,741,945 A * 5/1988 Brant et al.
4,838,524 A * 6/1989 McKeown et al.
5,079,074 A 1/1992 Steagall et al.
5,258,585 A * 11/1993 Juriga
5,334,338 A * 8/1994 Kittel et al.
5,459,291 A * 10/1995 Haines et al.
5,492,580 A 2/1996 Frank
5,536,556 A * 7/1996 Juriga
5,549,776 A * 8/1996 Juriga
5,565,259 A * 10/1996 Juriga
5,684,278 A * 11/1997 Yasukawa et al. ..... 181/286
5,721,177 A 2/1998 Frank
5,824,973 A * 10/1998 Haines et al.
5,866,235 A * 2/1999 Fredrick et al.
5,892,187 A * 4/1999 Patrick ..... 181/286
5,976,295 A 11/1999 Ang
6,145,617 A 11/2000 Alts
6,720,068 B1 4/2004 Alts et al.

FOREIGN PATENT DOCUMENTS

EP 0 229 977 A3 12/1986
EP 0 229 977 B1 12/1986
EP 0 229 977 A2 * 7/1987
EP 0 732 684 A2 * 9/1996
EP 0 934 180 B1 10/1997
GB 2 100 620 A 1/1983
GB 2 163 388 A * 2/1986
GB 2 319 998 A 6/1998
JP 62-48545 3/1987
JP 04009898 A 1/1992
WO WO 98/18656 A1 5/1998
WO WO 98/18657 A1 5/1998
WO WO 99/44817 9/1999

* cited by examiner

*Primary Examiner*—Khanh Dang
(74) *Attorney, Agent, or Firm*—Brooks Kushman P.C.

(57) ABSTRACT

An improved acoustical system for inhibiting noise in a motor vehicle. The system comprises an impermeable layer and an underlayment adjacent to the impermeable layer. The underlayment includes a first fibrous layer and a second fibrous layer. The underlayment has an airflow resistance between about 2000 and about 5000 mks Rayls.

32 Claims, 1 Drawing Sheet

LIGHTWEIGHT ACOUSTICAL SYSTEM

Matter enclosed in heavy brackets [ ] appears in the original patent but forms no part of this reissue specification; matter printed in italics indicates the additions made by reissue.

TECHNICAL FIELD

This invention relates to acoustical systems.

BACKGROUND ART

The use of a permeable facing fabric or film on an acoustical absorber to improve its low frequency response has been shown in the literature and in numerous commercial applications, primarily in the building and construction field. Recently this concept has been applied to motor vehicle interior acoustical products. While these arrangements may demonstrate improved sound transmission loss in the mid-frequency range as compared to a double-walled system, they also typically exhibit decreased sound transmission loss at higher frequencies. Furthermore, a porous surface may cause several practical problems. When used on the floor of a motor vehicle, an acoustical absorber having a water-permeable facing is susceptible to water intrusion which may cause formation of mildew and odor in the underpad, as well as rust the floor pan in some cases.

DISCLOSURE OF INVENTION

This invention provides an improved acoustical system comprising a water-impermeable layer and an underlayment. The underlayment is adjacent to the impermeable layer, and includes a first fibrous layer and a second fibrous layer. The first fibrous layer has a density less than the density of the second fibrous layer, and the underlayment has an airflow resistance between about 2000 and about 5000 mks Rayls.

Accordingly, it is an object of the present invention to provide an improved acoustical system which functions sufficiently over a broad frequency range. Another object of the present invention is to provide an improved acoustical barrier which is not susceptible to water intrusion.

These and other objects, features, and advantages of the present invention are readily apparent from the following detailed description of the best modes for carrying out the invention when taken in conjunction with the accompanying drawings.

BEST MODE FOR CARRYING OUT THE INVENTION

Figure 1:
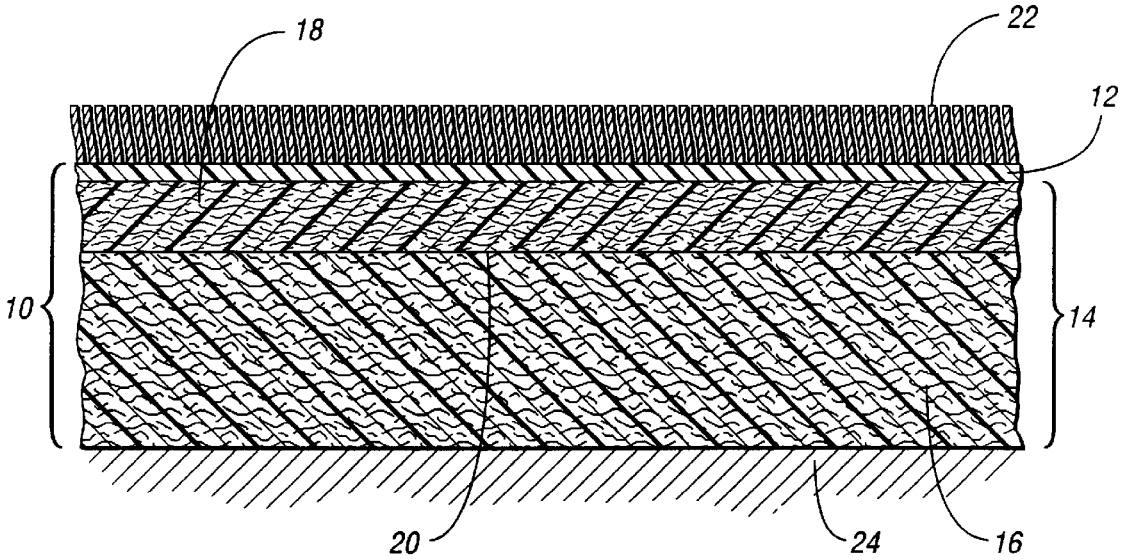
FIG. 1 is a cross-sectional view of an acoustical system according to the present invention.

With reference to the drawing, the preferred embodiments of the present invention will be described. FIG. 1 shows a system 10 for inhibiting noise in a motor vehicle. The system 10 comprises a water-impermeable, relatively lightweight layer 12 and an underlayment 14.

The underlayment 14 is situated next to the impermeable layer 12, and includes a first or lofty fibrous layer 16 and a second or compressed fibrous layer 18. In a preferred embodiment, both of the layers 16 and 18 contain recycled, non-woven fibers which have been fluffed and combed to create a non-directional matrix or batt. Both layers 16 and 18 preferably have a surface density between about 500 grams per square meter and about 1400 grams per square meter.

A semi-permeable layer 20, comprising a fusible plastic film or cellulose filter scrim with a heat-settable adhesive, is preferably positioned between the layers 16 and 18 to provide additional airflow resistance and to help bond the layers together. In the case of a scrim, the material preferably has a surface density in the range of about 44 grams per square meter. A decorative layer 22 such as carpet or a face fabric may also be provided adjacent to the impermeable layer 12.

To make the acoustical system 10, approximately equal thicknesses of the layers 16 and 18 are first preferably heat set through an oven. One of the layers 16 or 18 is then bonded to the semi-permeable layer 20, and the combination bonded to the other layer 18 or 16. The resulting laminate is heated for about 30–40 seconds at about 400 to 450 degrees F, and then put into a cooled mold. When the mold is closed, the layers 16 and 18 are differentially compressed. The facing 22, which is first coated with the impermeable layer 12 of a 200–500 grams per square meter polyethylene to a thickness less than 1 mm, and more preferably about 0.1 mm, is then bonded to the underlayment 14 by heating the impermeable layer to near its melting point, and then transferring it to a cool mold into which the underlayment has been placed.

In the final product, the underlayment 14 preferably has a total thickness of 10–25 millimeters (mm), with the second or compressed layer 18 accounting for about 3 mm of that thickness and a resultingly higher as-molded density than the first or lofty layer 16. In this configuration, the underlayment has a specific airflow resistance between about 2000 and about 5000 mks Rayls, and preferably between about 2500 and 4500 mks Rayls. The system 10 can be placed on the sheet metal 24 of the motor vehicle so that the lofty layer 16 is next to the metal and the compressed layer 18 is next to the impermeable layer 12.

The invention is an improvement over the prior art. It modifies the construction for improved performance over a broad frequency range and eliminates the physical deficiencies. The sound transmission loss of this system is significantly improved over a typical heavy barrier system in the mid-range frequencies of about 200 to 1000 Hz, and is roughly equivalent to a heavy barrier system at high frequencies as well. These results were not expected based on experience with previous lightweight systems. Other lightweight systems all demonstrate a significant reduction in transmission loss at higher frequencies. Furthermore, the system 10 is preferably formed entirely from thermoplastics so as to be totally recyclable.

This invention is particularly applicable to floor systems for motor vehicles, but may have other vehicle or architectural noise attenuation applications. In some of those applications, such as dash insulators for motor vehicles, a carpet is not necessary. The design of the impermeable layer allows the acoustical properties of the construction to be tailored for transmission loss and/or sound absorption over specific frequency regions.

While the embodiments of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. An acoustical system comprising:

a water-impermeable layer;

an underlayment adjacent to the impermeable layer, the underlayment including a first fibrous layer and a second fibrous layer, the first fibrous layer having a density less than a density of the second fibrous layer;

the underlayment having a specific airflow resistance between about 2000 and about 5000 mks Rayls; and a semi-permeable layer disposed between the first and second fibrous layers.

2. The acoustical system of claim 1 wherein the semi-permeable layer comprises a film.

3. The acoustical system of claim 1 wherein the first fibrous layer has a surface density between about 500 grams per square meter and about 1400 grams per square meter.

4. The acoustical system of claim 1 wherein the second fibrous layer has a surface density between about 500 grams per square meter and about 1400 grams per square meter.

5. The acoustical system of claim 1 wherein the second fibrous layer is adjacent to the impermeable layer.

6. The acoustical system of claim 1 wherein the second fibrous layer is a composite.

7. The acoustical system of claim 1 wherein the underlayment is situated between the impermeable layer and a noise source.

8. The acoustical system of claim 1 further comprising a decorative layer situated adjacent to the impermeable layer.

9. A carpet with noise-inhibiting characteristics for use in a motor vehicle, the carpet comprising:

a water-impermeable layer; and an underlayment adjacent to the impermeable layer, the underlayment including a first fibrous layer and a second fibrous layer, the first fibrous layer having a density less than a density of the second fibrous layer;

the underlayment having a specific airflow resistance between about 2000 and about 5000 mks Rayls;

wherein the first and second fibrous layers have a surface density between about 500 grams per square meter and about 1400 grams per square meter.

10. The carpet of claim 9 further comprising a semi-permeable layer disposed between the first and second fibrous layers.

11. The carpet of claim 10 wherein the semi-permeable layer comprises a film.

12. The carpet of claim 9 wherein the second fibrous layer is adjacent to the impermeable layer.

13. The carpet of claim 9 wherein the second fibrous layer is a composite.

14. The carpet of claim 9 wherein the underlayment is situated between the impermeable layer and a noise source.

15. The carpet of claim 9 wherein the first layer is situated between the second layer and a noise source.

16. A system for inhibiting noise in a motor vehicle, the system comprising:

an impermeable layer; and an underlayment adjacent to the impermeable layer, the underlayment including a first fibrous layer, a second fibrous layer, and a semi-permeable layer, the first layer having a surface density between about 500 grams per square meter and about 1400 [grains] *grams* per square meter, and the second layer having a surface density between about 500 grams per square meter and about 1400 grams per square meter;

the underlayment having a specific airflow resistance between about 2000 and about 5000 mks Rayls.

*17. An acoustical system comprising:*

*a water-impermeable layer;*

*an underlayment adjacent to the impermeable layer, the underlayment including a first layer and a second layer, the first layer having a density less than a density of the second layer, and a semi-permeable layer disposed between the first and second layers; and*

*the underlayment having a specific airflow resistance between about 2000 and about 5000 mks Rayls.*

*18. The acoustical system of claim 17 wherein the semi-permeable layer comprises a film.*

*19. The acoustical system of claim 17 wherein the first layer has a surface density between about 500 grams per square meter and about 1400 grams per square meter.*

*20. The acoustical system of claim 17 wherein the second layer has a surface density between about 500 grams per square meter and about 1400 grams per square meter.*

*21. The acoustical system of claim 17 wherein the second layer is adjacent to the impermeable layer.*

*22. The acoustical system of claim 17 wherein the second layer is a composite.*

*23. The acoustical system of claim 17 wherein the underlayment is situated between the impermeable layer and a noise source.*

*24. The acoustical system of claim 17 further comprising a decorative layer situated adjacent to the impermeable layer.*

*25. A carpet with noise-inhibiting characteristics for use in a motor vehicle, the carpet comprising:*

*a water-impermeable layer; and*

*an underlayment adjacent to the impermeable layer, the underlayment including a first layer and a second layer, the first layer having a density less than a density of the second layer;*

*the underlayment having a specific air flow resistance between about 2000 and 5000 mks Rayls;*

*wherein the first and second layers have a surface density between about 500 grams per square meter and about 1400 grams per square meter.*

*26. The carpet of claim 25 further comprising a semi-permeable layer disposed between the first and second layers.*

*27. The carpet of claim 26 wherein the semi-permeable layer comprises a film.*

*28. The carpet of claim 25 wherein the second layer is adjacent to the impermeable layer.*

*29. The carpet of claim 25 wherein the second layer is a composite.*

*30. The carpet of claim 25 wherein the underlayment is situated between the impermeable layer and a noise source.*

*31. The carpet of claim 25 wherein the first layer is situated between the second layer and a noise source.*

*32. A system for inhibiting noise in a motor vehicle, the system comprising:*

*an impermeable layer; and*

*an underlayment adjacent to the impermeable layer, the underlayment including a first layer, a second layer, and a semi-permeable layer, the first layer having a surface density between about 500 grams per square meter and about 1400 grams per square meter, and the second layer having a surface density between about 500 grams per square meter and about 1400 grams per square meter;*

*the underlayment having a specific airflow resistance between about 2000 and about 5000 mks Rayls.*

* * * * *